(12) United States Patent
Downie et al.

(10) Patent No.: US 11,983,094 B2
(45) Date of Patent: May 14, 2024

(54) SOFTWARE DIAGNOSTIC CONTEXT SELECTION AND USE

(71) Applicant: Microsoft Technology Licensing, LLC, Redmond, WA (US)

(72) Inventors: Mark Anthony Jelf Downie, Hilliard, OH (US); Jackson Davis, Carnation, WA (US); Thomas Lai, Redmond, WA (US); Andrew Richard Sterland, Issaquah, WA (US); Wai Hang ("Barry") Tang, Redmond, WA (US); Nikolaus Karpinsky, Edmonds, WA (US)

(73) Assignee: Microsoft Technology Licensing, LLC

( * ) Notice: Subject to any disclaimer, the term of this patent is extended or adjusted under 35 U.S.C. 154(b) by 701 days.

(21) Appl. No.: 16/704,925

(22) Filed: Dec. 5, 2019

(65) Prior Publication Data
US 2021/0173760 A1 Jun. 10, 2021

(51) Int. Cl.
*G06F 11/36* (2006.01)
*G06N 20/00* (2019.01)

(52) U.S. Cl.
CPC ........ *G06F 11/366* (2013.01); *G06F 11/3636* (2013.01); *G06F 11/3664* (2013.01); *G06N 20/00* (2019.01)

(58) Field of Classification Search
CPC ............... G06F 11/362; G06F 11/3636; G06F 11/366–3668; G06F 11/3692; G06N 20/00
See application file for complete search history.

(56) References Cited

U.S. PATENT DOCUMENTS

| | | | |
|---|---|---|---|
| 7,191,364 B2 | 3/2007 | Hudson et al. | |
| 7,343,523 B2 * | 3/2008 | Cheong | G06F 11/3604 714/38.12 |

(Continued)

OTHER PUBLICATIONS

Tan e al., "Mochi: Visual Log-Analysis Based Tools for Debugging Hadoop", published by USENIX, HotCloud09, pp. 1-5 (Year: 2009).*

(Continued)

*Primary Examiner* — S. Sough
*Assistant Examiner* — Zheng Wei
(74) *Attorney, Agent, or Firm* — Ogilvie Law Firm

(57) ABSTRACT

Embodiments improve software defect diagnosis. Analytic focus is automatically walked back from an initial symptomatic diagnostic context to a previous diagnostic context that is closer to underlying causes. Diagnosis may obtain diagnostic artifacts such as traces or dumps, extract diagnostic context, decompile executables, lookup likely causes based on symptoms, scan logs, and submit diagnostic context to software analysis services. An analysis service may perform static analysis, security testing, symptom-pair lookups, or antipattern scanning, for example, and may include a neural network or other machine learning model, for example. Root causes are culled from analysis results and identified to a software developer. Changes to mitigate the defect's impact are suggested in some cases. Thus, the software developer receives debugging leads without manually navigating through all the tool interfaces or unrelated details of diagnostic contexts. This allows the developer to more efficiently reach a useful diagnosis of defects, even for unfamiliar issues.

20 Claims, 4 Drawing Sheets

(56) References Cited

U.S. PATENT DOCUMENTS

| | | | |
|---|---|---|---|
| 7,665,063 B1* | 2/2010 | Hofmann | G06N 5/025 |
| | | | 717/111 |
| 7,681,182 B1* | 3/2010 | Mistry | G06F 11/366 |
| | | | 717/132 |
| 7,721,263 B2* | 5/2010 | Swoboda | G06F 11/3636 |
| | | | 717/124 |
| 8,601,451 B2 | 12/2013 | Bartram et al. | |
| 9,875,173 B2 | 1/2018 | Marron et al. | |
| 9,916,232 B2 | 3/2018 | Voccio et al. | |
| 10,055,274 B2 | 8/2018 | Burugula et al. | |
| 10,185,645 B2 | 1/2019 | Mola et al. | |
| 10,296,443 B2* | 5/2019 | Grechanik | G06F 11/079 |
| 10,338,902 B1 | 7/2019 | Sevigny | |
| 10,379,925 B2 | 8/2019 | Hu et al. | |
| 10,684,940 B1* | 6/2020 | Kayal | G06F 11/3664 |
| 2006/0046854 A1 | 3/2006 | Arevalo Baeza et al. | |
| 2006/0184829 A1 | 8/2006 | Cheong et al. | |
| 2006/0190770 A1 | 8/2006 | Harding | |
| 2006/0259895 A1* | 11/2006 | Thibadeau | G06F 9/45512 |
| | | | 717/115 |
| 2006/0277527 A1 | 12/2006 | Davis et al. | |
| 2007/0150879 A1* | 6/2007 | Rangarajan | G06F 9/44589 |
| | | | 717/154 |
| 2008/0127054 A1 | 5/2008 | Stubbs et al. | |
| 2008/0127055 A1 | 5/2008 | Davis et al. | |
| 2008/0209401 A1 | 8/2008 | Fanning et al. | |
| 2009/0089764 A1 | 4/2009 | Lai et al. | |
| 2009/0113251 A1 | 4/2009 | Goossen et al. | |
| 2009/0288065 A1 | 11/2009 | Nathan et al. | |
| 2009/0288067 A1 | 11/2009 | Nathan et al. | |
| 2009/0293059 A1 | 11/2009 | Nathan et al. | |
| 2009/0293073 A1 | 11/2009 | Nathan et al. | |
| 2010/0058114 A1 | 3/2010 | Perkins et al. | |
| 2010/0192134 A1 | 7/2010 | Arkhipov | |
| 2011/0145662 A1 | 6/2011 | Yuan et al. | |
| 2012/0304156 A1 | 11/2012 | Feiveson et al. | |
| 2012/0311533 A1 | 12/2012 | Fanning et al. | |
| 2012/0331351 A1 | 12/2012 | Davis et al. | |
| 2013/0067585 A1 | 3/2013 | Sterland et al. | |
| 2013/0132777 A1 | 5/2013 | Froehlich | |
| 2013/0212595 A1 | 8/2013 | Fanning et al. | |
| 2013/0219369 A1 | 8/2013 | Rector et al. | |
| 2013/0249917 A1 | 9/2013 | Fanning et al. | |
| 2013/0311973 A1 | 11/2013 | Rice et al. | |
| 2013/0326490 A1 | 12/2013 | Anderson et al. | |
| 2014/0040897 A1 | 2/2014 | Davis et al. | |
| 2014/0075451 A1 | 3/2014 | Anderson et al. | |
| 2014/0282417 A1 | 9/2014 | Paveza et al. | |
| 2014/0282427 A1 | 9/2014 | Fanning et al. | |
| 2014/0380102 A1 | 12/2014 | Lindo et al. | |
| 2015/0127991 A1 | 5/2015 | Davis et al. | |
| 2015/0135194 A1 | 5/2015 | Alvarez Cavazos et al. | |
| 2015/0143344 A1 | 5/2015 | Davis | |
| 2015/0161397 A1 | 6/2015 | Cook et al. | |
| 2015/0199259 A1 | 7/2015 | Paveza et al. | |
| 2015/0199261 A1 | 7/2015 | Paveza et al. | |
| 2015/0347269 A1 | 12/2015 | Nelson et al. | |
| 2015/0347274 A1 | 12/2015 | Taylor et al. | |
| 2016/0124834 A1 | 5/2016 | Davis et al. | |
| 2016/0239357 A1 | 8/2016 | Davis et al. | |
| 2017/0068816 A1 | 3/2017 | Cavazos | |
| 2017/0212829 A1 | 7/2017 | Bales | |
| 2017/0300400 A1 | 10/2017 | Davis | |
| 2017/0323345 A1* | 11/2017 | Flowers | G06F 17/18 |
| 2017/0371768 A1* | 12/2017 | Iyer | G06F 11/3636 |
| 2018/0024911 A1 | 1/2018 | Kruszewski et al. | |
| 2018/0060213 A1 | 3/2018 | Mola | |
| 2018/0060215 A1 | 3/2018 | Mola | |
| 2018/0146157 A1 | 5/2018 | Karpinsky | |
| 2018/0239659 A1 | 8/2018 | Nallabothula et al. | |
| 2018/0307582 A1* | 10/2018 | Vikjord | G06F 11/362 |
| 2018/0322028 A1 | 11/2018 | Davis et al. | |
| 2018/0322030 A1 | 11/2018 | Davis et al. | |
| 2019/0057012 A1 | 2/2019 | Fanning et al. | |
| 2019/0073250 A1 | 3/2019 | Davis et al. | |
| 2019/0146785 A1 | 5/2019 | Davis | |
| 2019/0213355 A1 | 7/2019 | Raviv et al. | |
| 2019/0243746 A1* | 8/2019 | Damodaran | G06F 3/04817 |
| 2019/0286549 A1 | 9/2019 | Mola et al. | |
| 2019/0324891 A1 | 10/2019 | Mola et al. | |
| 2019/0324892 A1 | 10/2019 | Gabryjelski et al. | |
| 2019/0325980 A1 | 10/2019 | Nelson et al. | |
| 2020/0241949 A1* | 7/2020 | Basu | G06F 11/079 |
| 2020/0285564 A1* | 9/2020 | Ciano | G06F 11/3612 |
| 2021/0048993 A1 | 2/2021 | Burke | |
| 2021/0089400 A1* | 3/2021 | Kashani | G06F 21/52 |
| 2021/0149788 A1 | 5/2021 | Downie et al. | |

OTHER PUBLICATIONS

Shokripou et al., "Automatic Bug Assignment Using Information Extraction Methods", published by IEEE, 2012 International Conference on Advanced Computer Science Applications and Technologies, ages 144-149 (Year: 2013).*

"International Search Report and Written Opinion Issued in PCT Application No. PCT/US20/059896", Mailed Date : Feb. 25, 2021, 17 Pages.

"International Search Report and Written Opinion Issued in PCT Application No. PCT/US20/057613", Mailed Date: Feb. 3, 2021, 9 Pages.

"What is the purpose of a Data Access Layer?", retrieved from <<https://stackoverflow.com/questions/59942/what-is-the-purpose-of-a-data-access-layer>>, Nov. 21, 2010, 4 pages.

"Data access layer", retrieved from <<https://en.wikipedia.org/wiki/Data_access_layer>>, Aug. 21, 2017, 2 pages.

"Elm Debugger", retrieved from <<http://debug.elm-lang.org/>>, copyright 2014, 4 pages.

"Microsoft/PTVS", retrieved from <<https://github.com/Microsoft/PTVS>>, No later than Mar. 1, 2018, 2 pages.

"How does reverse debugging work?", retrieved from <<https://stackoverflow.com/questions/1470434/how-does-reverse-debugging-work>>, Sep. 24, 2009, 5 pages.

Bhansali, et al., "Framework for Instruction-level Tracing and Analysis of Program Executions", retrieved from <<http://static.usenix.org/events/vee06/full_papers/p154-bhansali.pdf>>, 2006, 10 pages.

Mußler, et al., "A Generic Binary Instrumenter and Heuristics to Select Relevant Instrumentation Points", retrieved from <<http://juser.fz-juelich.de/record/12504/files/J%C2%A9%C6%A1l_4335_Mu%C2%A9ler.pdf>>, Nov. 2010, 110 pages.

"Time Travel Debugging—Record a trace", retrieved from <<https://docs.microsoft.com/en-us/windows-hardware/drivers/debugger/time-travel-debugging-record>>, Sep. 22, 2017, 5 pages.

"Microsoft/PTVS", retrieved from <<https://github.com/Microsoft/PTVS/tree/master/Python/Product/Debugger.Concord>>, no later than Mar. 1, 2018, 1 page.

Cabral, et al., "RAIL: code instrumentation for .NET", retrieved from <<https://www.researchgate.net/publication/221001208_RAIL_code_instrumentation_for_NET>>, Jan. 2005, 7 pages.

"RevDeBug", retrieved from <<https://www.revdebug.com/>>, no later than Mar. 1, 2018, 7 pages.

"RevDeBug Tutorial", retrieved from <<https://revdebug.com/doc/tutorial/2.5.0.0/Selectiverecording-Whitelisting>>, no later than Mar. 1, 2018, 6 pages.

"Reverse/'Time Traveling' Debuggers for Javascript", retrieved from <<https://stackoverflow.com/questions/21841808/reverse-time-traveling-debuggers-for-javascript>>, Feb. 18, 2014, 1 page.

"Rider", retrieved from <<https://www.jetbrains.com/rider/>>, no later than Mar. 1, 2018, 4 pages.

Tamches, et al., "Fine-Grained Dynamic Instrumentation of Commodity Operating System Kernels", retrieved from <<http://pages.cs.wisc.edu/~paradyn/ParadynWeek/1999-notes/tamches.pdf>>, 1999, 24 pages.

"Reverse debugging, time travel debugging", retrieved from <<https://undo.io/resources/whitepapers/reverse-debugging-whitepaper/>>, no later than Mar. 1, 2018, 10 pages.

(56) References Cited

OTHER PUBLICATIONS

Jamesp, "Time Travel Debugging in WinDbg Preview!", retrieved from <<https://blogs.msdn.microsoft.com/windbg/2017/09/25/time-travel-debugging-in-windbg-preview/>>, Sep. 25, 2017, 35 pages.

"Tracing_(software)", retrieved from <<https://en.wikipedia.org/wiki/Tracing_(software)>>, Aug. 30, 2017, 4 pages.

"UndoDB", retrieved from <<https://undo.io/products/undodb/>>, No. later than Mar. 1, 2018, 7 pages.

"What is the principle of 'Time Travel Debugger'?", retrieved from <<https://stackoverflow.com/questions/42104003/what-is-the-principle-of-time-travel-debugger>>, Oct. 8, 2017, 3 pages.

Balzer, "Exdams—Extendable Debugging and Monitoring System", retrieved from << http://www.dtic.mil/dtic/tr/fulltext/u2/686373.pdf>>, 1969, 40 pages.

Coetzee, "Combining reverse debugging and live programming towards visual thinking in computer programming", retrieved via <<http://scholar.sun.ac.za/handle/10019.1/96853>>, Mar. 2015, 105 pages.

"Hacker News", retrieved from <<https://news.ycombinator.com/item?id=15043357>>, Aug. 18, 2017, 3 pages.

Thomas Claburn, "FYI: AI tools can unmask anonymous coders from their binary executables", retrieved from <<https://www.theregister.co.uk/2018/03/16/identifying_anonymous_programmers/>>, Mar. 16, 2018, 10 pages.

"Can machine learning be used to develop better reverse engineering/decompilation tools?", retrieved from <<https://ai.stackexchange.com/questions/9735/can-machine-learning-be-used-to-develop-better-reverse-engineering-decompilation>>, Jun. 9, 2019, 5 pages.

Freyja Spaven, "How to debug Java using a decompiler", retrieved from <<https://raygun.com/blog/debug-java/>>, Sep. 1, 2016, 9 pages.

"Decompiler", retrieved from <<https://en.wikipedia.org/wiki/Decompiler>>, Aug. 18, 2019, 6 pages.

"Data-flow analysis", retrieved from <<https://en.wikipedia.org/wiki/Data-flow_analysis>>, Sep. 17, 2019, 9 pages.

"Telerik JustCode Manual", retrieved from <<http://docs.telerik.com/help/justcode/decompile-for-debugging.html>>, Copyright © 2009-2016, 1 page.

Gil Sever, "Applitools Root Cause Analysis: Found a Bug? We'll Help You Fix It!", retrieved from <<https://applitools.com/blog/applitools-root-cause-analysis-found-a-bug-well-help-you-fix-it?utm_referrer=https://www.google.com/>>, Jun. 2019, 8 pages.

"VulnScan—Automated Triage and Root Cause Analysis of Memory Corruption Issues", retrieved from <<https://msrc-blog.microsoft.com/2017/10/03/vulnscan-automated-triage-and-root-cause-analysis-of-memory-corruption-issues/>>, Oct. 3, 2017, 21 pages.

"Time Travel Debugging—Overview", retrieved from <<https://docs.microsoft.com/en-us/windows-hardware/drivers/debugger/time-travel-debugging-overview>>, Apr. 14, 2019, 8 pages.

"Anti-pattern", retrieved from <<https://en.wikipedia.org/wiki/Anti-pattern>>, Oct. 24, 2019, 6 pages.

"Can AI Generate Programs to Help Automate Busy Work?", retrieved from << https://blogs.technet.microsoft.com/machinelearning/2018/09/26/can-ai-generated-code-automate-tedious-elements-of-knowledge-work/>>, Sep. 26, 2018, 15 pages.

Mika, "Write Better Code Faster with Roslyn Analyzers", retrieved from <<https://devblogs.microsoft.com/dotnet/write-better-code-faster-with-roslyn-analyzers/>>, Jul. 10, 2019, 7 pages.

"Async/await—when to return a Task vs void?", retrieved from <<https://stackoverflow.com/questions/12144077/async-await-when-to-return-a-task-vs-void>>, Sep. 14, 2018, 9 pages.

Rafal Wojtczuk, "UQBTng: a tool capable of automatically finding integer overflows in Win32 binaries", retrieved from <<https://events.ccc.de/congress/2005/fahrplan/attachments/552-Paper_AToolCapableOfAutomaticallyFindingIntegerOverflowsInWin32Binaries.pdf>>, Nov. 27, 2005, 6 pages.

"Security Code Scan—static code analyzer for .NET", retrieved from <<https://security-code-scan.github.io/>>, no later than Nov. 6, 2019, 39 pages.

"Source Code Analysis Tools", retrieved from <<https://www.owasp.org/index.php/Source_Code_Analysis_Tools>>, Oct. 24, 2019, 6 pages.

"Static program analysis", retrieved from <<https://en.wikipedia.org/wiki/Static_program_analysis>>, Sep. 25, 2019, 3 pages.

"IID: Sync-Over-Async Pattern", retrieved from <<https://www.prolifics.com/blog/iid-sync-over-async-pattern>>, no later than Nov. 5, 2019, 8 pages.

"List of tools for static code analysis", retrieved from <<https://en.wikipedia.org/wiki/List_of_tools_for_static_code_analysis>>, Nov. 1, 2019, 13 pages.

Jason Brownlee, "A Tour of The Most Popular Machine Learning Algorithms", retrieved from <<https://machinelearningmastery.com/a-tour-of-machine-learning-algorithms/>>, Aug. 12, 2019, 60 pages.

"Trust boundary", retrieved from <<https://en.wikipedia.org/wiki/Trust_boundary>>, Oct. 4, 2019, 1 page.

"Source Code Analyzer", retrieved from <<https://www.veracode.com/products/static-analysis-sast/source-code-security-analyzer>>, no later than Nov. 5, 2019, 6 pages.

"Live variable analysis", retrieved from <<https://en.wikipedia.org/wiki/Live_variable_analysis>>, Jan. 7, 2019, 3 pages.

"Computer Forensics Tools & Techniques Catalog: Memory Capture and Analysis", retrieved from <<https://toolcatalog.nist.gov/search/index.php?all_tools=all&ff_id=7&1%5B%5D=any&2%5B%5D=any&3%5B%5D=any>>, Oct. 29, 2019, 7 pages.

"Non Final Office Action Issued in U.S. Appl. No. 16/687,444", Mailed Date: Dec. 29, 2021, 55 Pages.

"Final Office Action Issued in U.S. Appl. No. 16/687,444", Mailed Date: Jun. 27, 2022, 25 Pages.

Communication Pursuant to Article 94(3) EPC received for European Application No. 20820622.7, mailed on Oct. 24, 2023, 12 pages.

Wieman, Ruben, "Anti-Pattern Scanner: An Approach to Detect Anti-Patterns and Design Violations", Tu Delft, Jan. 1, 2011, 141 pages.

* cited by examiner

SOFTWARE DIAGNOSTIC CONTEXT SELECTION AND USE

BACKGROUND

A wide variety of computing systems provide functionality that depends at least in part on software. Such computing systems are not limited to laptops or servers or other devices whose primary purpose may be deemed computation. Computing systems also include smartphones, industrial equipment, vehicles (land, air, sea, and space), consumer goods, medical devices, communications infrastructure, security infrastructure, electrical infrastructure, and other systems that execute software. The software may be executed from volatile or non-volatile storage, as firmware or as scripts or as binary code or otherwise. In short, software can be extremely useful in a wide variety of ways.

However, computing systems may have various kinds of functionality defects, which may be due in whole or in part to software defects or deficiencies. Sometimes a computing system follows an erroneous or undesired course of computation, and yields insufficient or incorrect results. Sometimes a computing system hangs, by stopping entirely, or deadlocking, or falling into an infinite loop. Sometimes a computing system provides complete and correct results, but is slow or inefficient in its use of processor cycles, memory space, network bandwidth, or other computational resources. Sometimes a computing system operates efficiently and provides correct and complete results, but does so only until it succumbs to a security vulnerability.

Accordingly, advances and improvements in the functionality of computing systems may be obtained by advancing or improving the tools and techniques available for identifying and understanding functionality defects of software. This includes in particular defects in any software that is used to create, deploy, operate, update, manage, or diagnose computing system software.

SUMMARY

Some embodiments described in this document provide improved diagnosis of defects in computing systems. In particular, some embodiments automatically walk back an analytic focus from a secondary diagnostic context, in order to select a primary diagnostic context that is closer to an underlying problem. This automatic selection of the primary diagnostic context allows automated analysis tools and software developers alike to more effectively bring analytic tools and techniques to bear on defective software when an underlying defect is obscured. In this regard, a "developer" is any person who is tasked with, or attempting to, create, modify, deploy, operate, update, manage, or understand functionality of software.

Some embodiments help identify causes of computing functionality defects by obtaining a diagnostic artifact associated with a computing functionality defect of a program, extracting a secondary diagnostic context from the diagnostic artifact, transparently and automatically ascertaining a primary diagnostic context of the program which preceded the secondary diagnostic context during an execution of the program, submitting at least a portion of the diagnostic contexts to a software analysis service, receiving from the software analysis service an analysis result which indicates a suspected cause of the computing functionality defect, and identifying the suspected cause to a software developer. These embodiments provide software developers with debugging leads, without requiring the software developers to navigate through the diagnostic contexts. Some embodiments also suggest changes that can mitigate the defect's impact.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
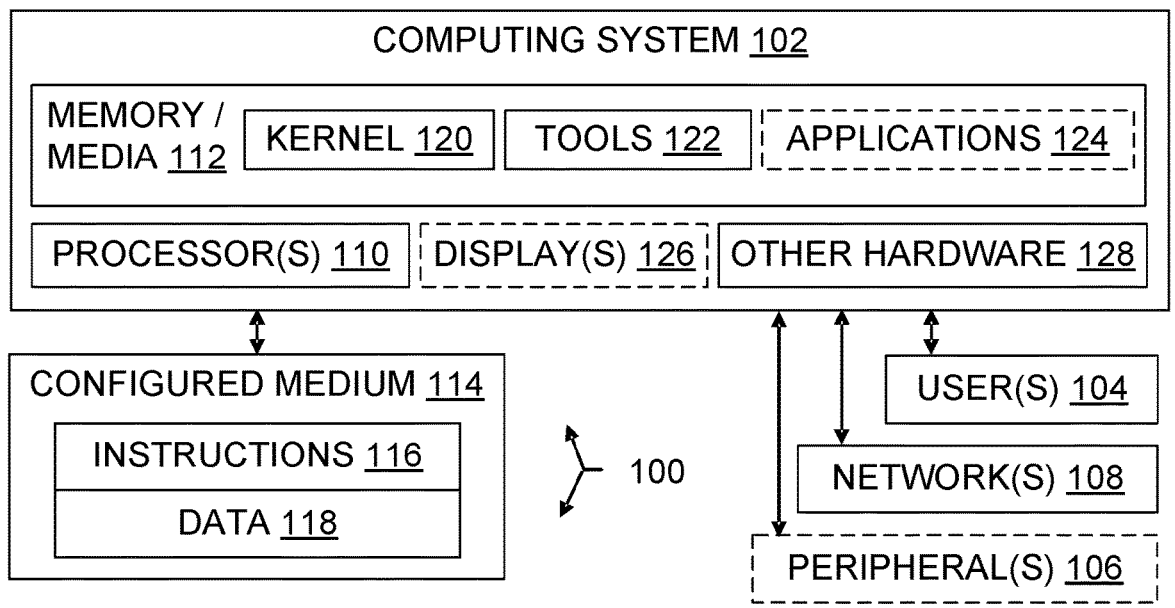
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability and coverage scope of Microsoft software development offerings.

In particular, a technical challenge was to how to make debugging and diagnosing complex issues easier and faster, and how to allow more developers to tackle complex production issues. Innovations that successfully address such challenges will ultimately improve developer productivity and satisfaction for development tool offerings, including not only Microsoft Visual Studio® offerings and its associate platforms, but also enhanced development tools from other vendors who are authorized to use the innovations claimed here (mark of Microsoft Corporation). Better software development offerings lead directly to improvements in the functioning of computing systems themselves, as the software running those systems improves.

As a particular example, consider an async-sync defect, which may occur when a program implements a sync-over-async pattern. This pattern allows a component X to synchronously invoke a component Y, even though Y has an asynchronous implementation. A runtime may intercept this synchronous invocation by X and switch it to an asynchronous implementation, leading to thread pool depletion, followed by debilitating exceptions and other unexpected and unwanted behavior. Faced with such situations, some familiar approaches tend to only reveal where a secondary context where a second chance exception occurred, or where the program finally hung. In the case of an async-void hang a familiar approach might at best land a debugger in some decompiled code of a runtime or other framework, giving the developer no clear mechanism for finding the primary context along with a location in application source code where the real issue originated.

Some embodiments presented here provide developers with a better understanding of the root cause of a program failure by automatically walking back from symptoms like crashes or timeouts to underlying causes such as buffer overruns, infinite loops, synchronization failures, and other defects that occur in software. The walk backward through diagnostic contexts may be implemented using time travel trace replay, static data flow analysis, log analysis, or search criteria such as where a particular variable was nulled, where a particular task was triggered, or where an event handler was added to a particular event source. By walking back the analytic focus to select a better diagnostic context than the one initially presented—that is, to select a diagnostic context that is closer to the underlying root cause—embodiments may significantly improve the efficiency and the results of fully or partially automated software defect analysis.

These are merely examples. Other aspects of these embodiments and other software defect diagnosis embodiments are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, defect diagnosis functionality could be installed on an air gapped system and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
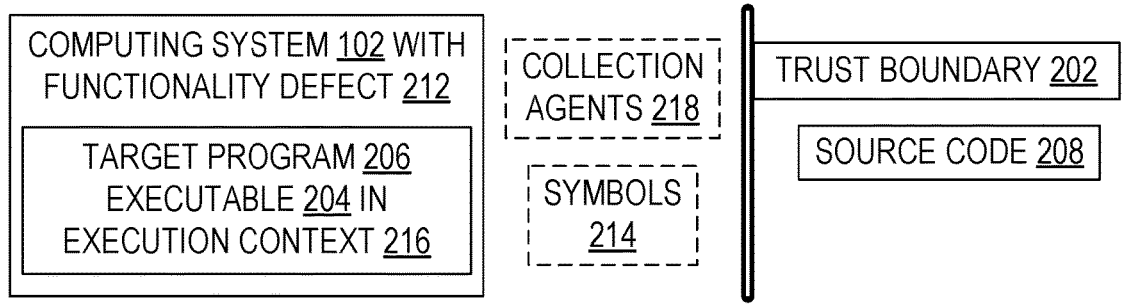
FIG. 2 is a block diagram illustrating some aspects of some computer program executions and their environment.

FIG. 2 illustrates some aspects of some computer program executions, program execution contexts 216, and encompassing environments 100. A difference between an execution context 216 and an environment 100 is that an execution context 216 is limited to the particular computing system(s) 102 on which a program 206 executed, but an environment 100 is not. For example, an environment 100 may include collection agents 218 that scour local and remote locations to collect diagnostic artifacts 304 for use in diagnosing software defects 212.

As shown in FIG. 2, in some situations a trust boundary 202 separates an executable 204 of a program 206 from a source code 208 that is a basis for that executable 204. Thus, on the executable's side of the trust boundary, there is a lack of the source code 208 from which the executable 204 originated. The original source code 208 could be helpful in diagnosing a functionality defect 212 exhibited by the system 102 in which the executable 204 executes.

But crossing the trust boundary 202 to get at the original source code may be difficult, unduly time-consuming, too expensive, or otherwise not feasible fora developer who wants to diagnose the underlying cause(s) of the defect 212. For example, due to the intervening trust boundary 202, accessing the source code 208 may require authentication or authorization credentials that the developer does not have and cannot readily obtain.

An effective lack of source code 208 may also or instead be due to a presence only of encrypted source code 208 for which a decryption key is absent, or due to a presence only of compressed or scrambled or obfuscated or encoded source code 208 when decompression or descrambling or deobfuscated or decoded source code is absent or unavailable, or due to a presence only of source code that may have been corrupted or tampered with, for example.

Regardless of the particular reasons behind source unavailability, some embodiments mitigate a lack of original source code 208 by providing or using decompiled source 404, and some embodiments use symbols 214 to enhance decompilation.

However, teachings herein are not limited to situations in which decompiled source 404 is used. Many teachings herein may be applied beneficially regardless of whether or not an original source 208 or a decompiled source 404 (or both) are available or are used in the defect analysis.

Figure 3:
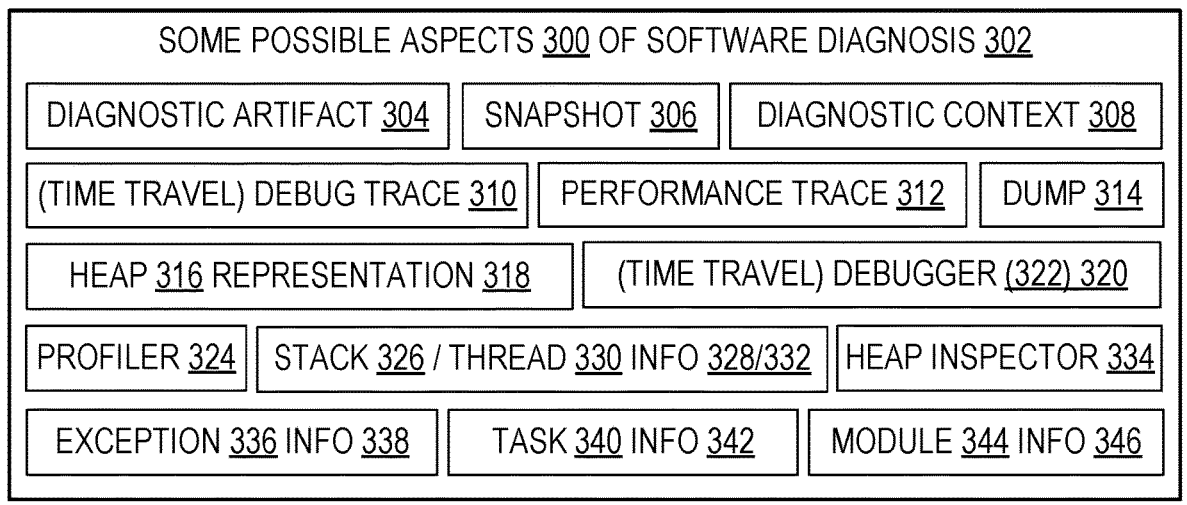
FIG. 3 is a block diagram illustrating some aspects of software defect diagnosis in some situations and some environments.

FIG. 3 illustrates various aspects 300 of software defect diagnosis 302. These aspects are discussed at various points herein, and additional details regarding them are provided in the discussion of a List of Reference Numerals later in this disclosure document.

Figure 4:
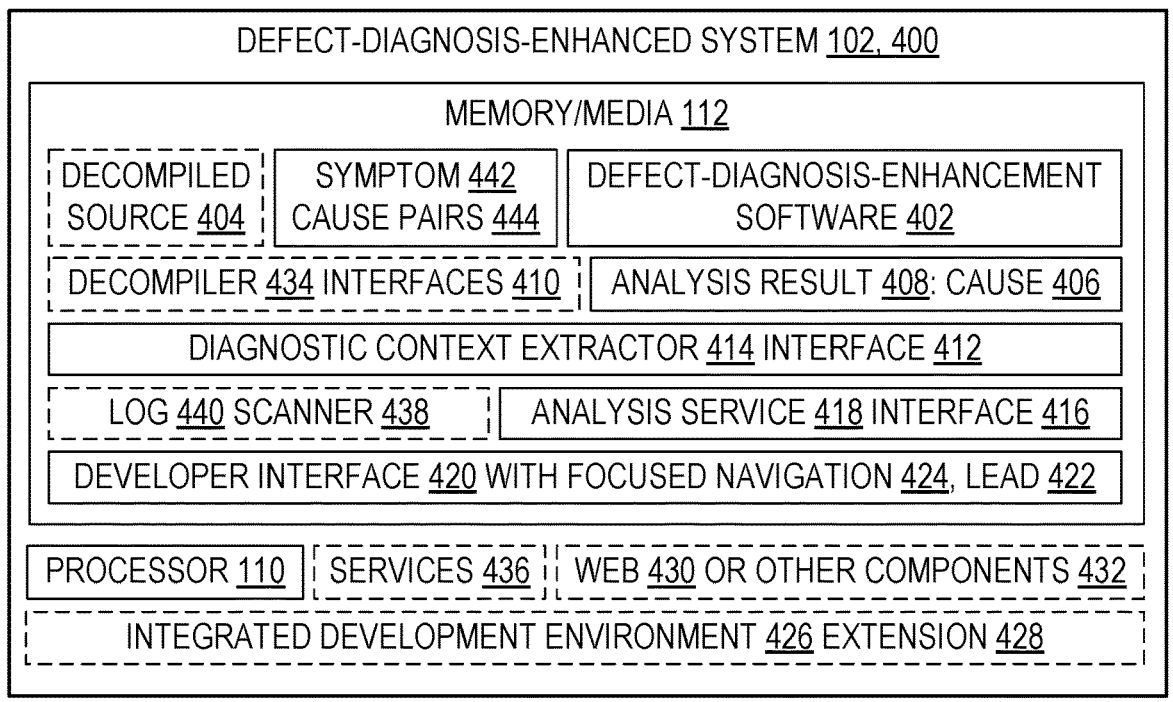
FIG. 4 is a block diagram illustrating some embodiments of a defect diagnosis system.

FIG. 4 illustrates some embodiments of a defect diagnosis system 400, which is a system 102 having some or all of the diagnosis functionality enhancements taught herein. The illustrated system 400 includes defect-diagnosis-enhancement software 402. Software 402 detects or receives an indication 802 that a defect 212 is to be diagnosed. In response, software 402 may automatically obtain relevant diagnostic artifacts 304, extract diagnostic context 308 from the artifacts 304, get decompiled source 404 using a decompiler 434, scan 438 logs 440, ascertain a primary diagnostic context from one or more subsequent secondary diagnostic contexts, match symptoms 442 to causes 406 based on defined pairings 444, submit portions of diagnostic context to analysis services 418, and identify to a developer one or more suspected underlying causes 406 of the defect 212, which are culled from the analysis results 408. The defect 212 may be manifest in any kind of target program 206, and in particular may manifest itself (or be hidden in) in a web component 430 or another component 432 of a target program 206.

In some embodiments, instructions 116 to perform some or all of these operations is embedded in diagnosis software 402. However, an embodiment may also perform diagnosis 302 by invoking separate tools or other services that also exist and function independently of and outside of the diagnosis software 402. Accordingly, the example illustrated in FIG. 4 may include decompiler interfaces 410, and the FIG. 4 example does include interfaces 412 to one or more diagnostic context extractors 414 and interfaces 416 to one or more software analysis services 418.

Regardless of the mix of embedded operations versus external invoked operations, a developer interface 420 eventually displays the suspected causes 406 to a developer as part or all of a diagnostic lead 422. In addition to identifying causes 406, a diagnostic lead may include suggestions for reducing or removing the unwanted impact of the defect 212. A lead 422 may also display some of the decompiled source 404 to help the developer better understand the defect 212.

In some embodiments, the developer interface 420 offers the developer only tightly focused navigation 424. For example, the navigation 424 available to the developer in the developer interface 420 may avoid displaying the interfaces or interface data of a decompiler 434, an artifact collector 218, a log scanner 438, or another diagnostic context extractor 414. Thus, an embodiment may provide the software developer with a debugging lead without requiring the software developer to navigate through the initial diagnostic context 308 or subsequently selected diagnostic contexts 308. An embodiment may similarly provide debugging leads 422 without requiring the software developer to be familiar with the interfaces of tools or services that perform artifact collection, diagnostic context extraction, decompilation, log scanning, or software analysis.

In some embodiments, diagnosis software 402 is embedded in an Integrated Development Environment (IDE) 426, or is accessible through an IDE, e.g., by virtue of an IDE extension 428. An IDE 426 generally provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Figure 5:
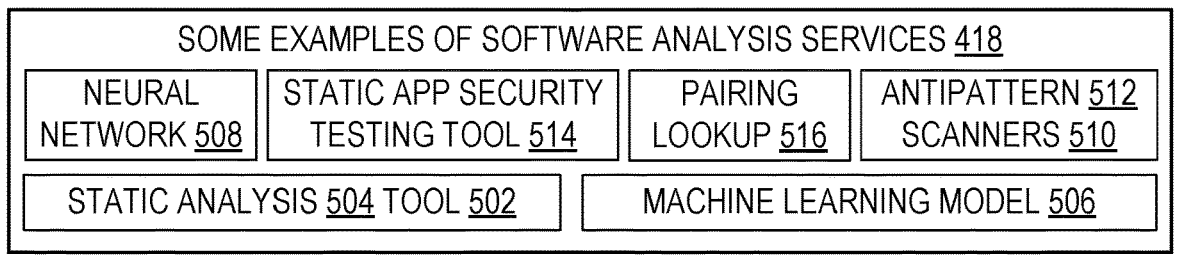
FIG. 5 is a block diagram illustrating some examples of software analysis services.

FIG. 5 illustrates some examples of analysis services 418. Many services 418 are source-based, but the teachings herein are not limited to embodiments that use source-based analysis services 418. The examples shown include tools 502 that perform static analysis 504, machine learning models 506 trained on source code, source-code trained neural networks 508, scanners 510 that look for antipatterns 512, static application security testing (SAST) tools 514, and lookup mechanisms 516 that match symptoms 442 with plausible or likely underlying causes 406 based on predetermined pairings 444. This set of examples is not exhaustive. Also, these examples are not necessarily mutually exclusive. For instance, a neural network 508 is one kind of machine learning model 506. Similarly, a SAST tool 514 may include a scanner 510 for security vulnerability antipatterns 512.

Figure 6:
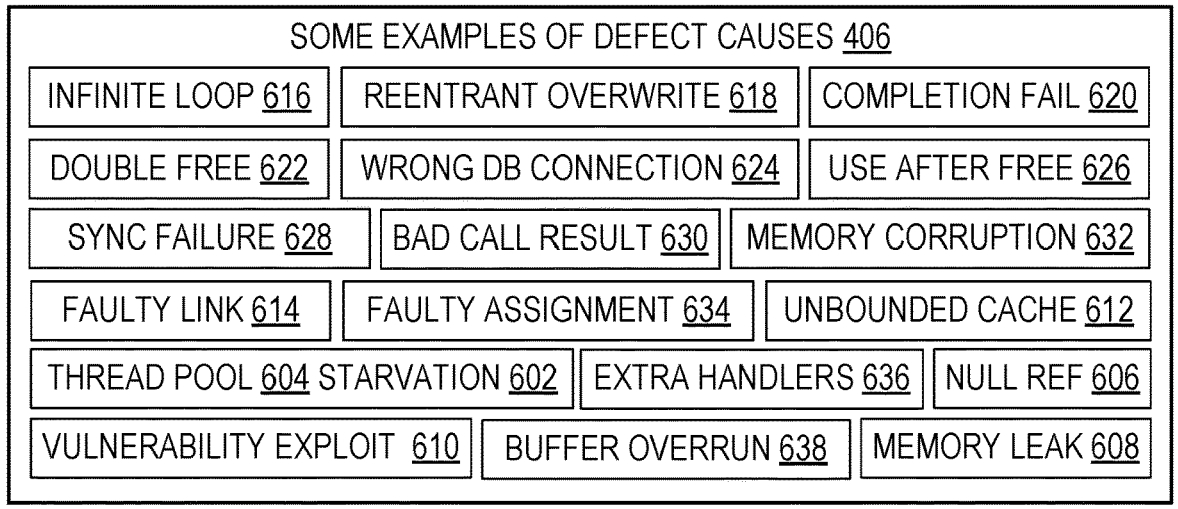
FIG. 6 is a block diagram illustrating some examples of root causes of software defects.

FIG. 6 illustrates some examples of defect causes 406. The examples shown include thread pool starvation 602, a null reference 606, a memory leak 608, an exploited security vulnerability 610, an unbounded cache 612, a faulty navigation link 614, an infinite loop 616, a reentrant overwrite 618, a task completion fail 620, a double free 622, a wrong database connection 624, a use after free 626, a synchronization failure 628, a bad function call result 630, a memory corruption 632, a faulty assignment 634, extra event handlers 636, and a buffer overrun 638. This set of examples is not exhaustive. Also, these examples are not necessarily mutually exclusive. For instance, a failure to validate input may be exploited as a security vulnerability 610 which overwrites part of an executable 204 during a buffer overrun 638 and thus creates a null reference 606 or a faulty navigation link 614.

Figures 7, 8:
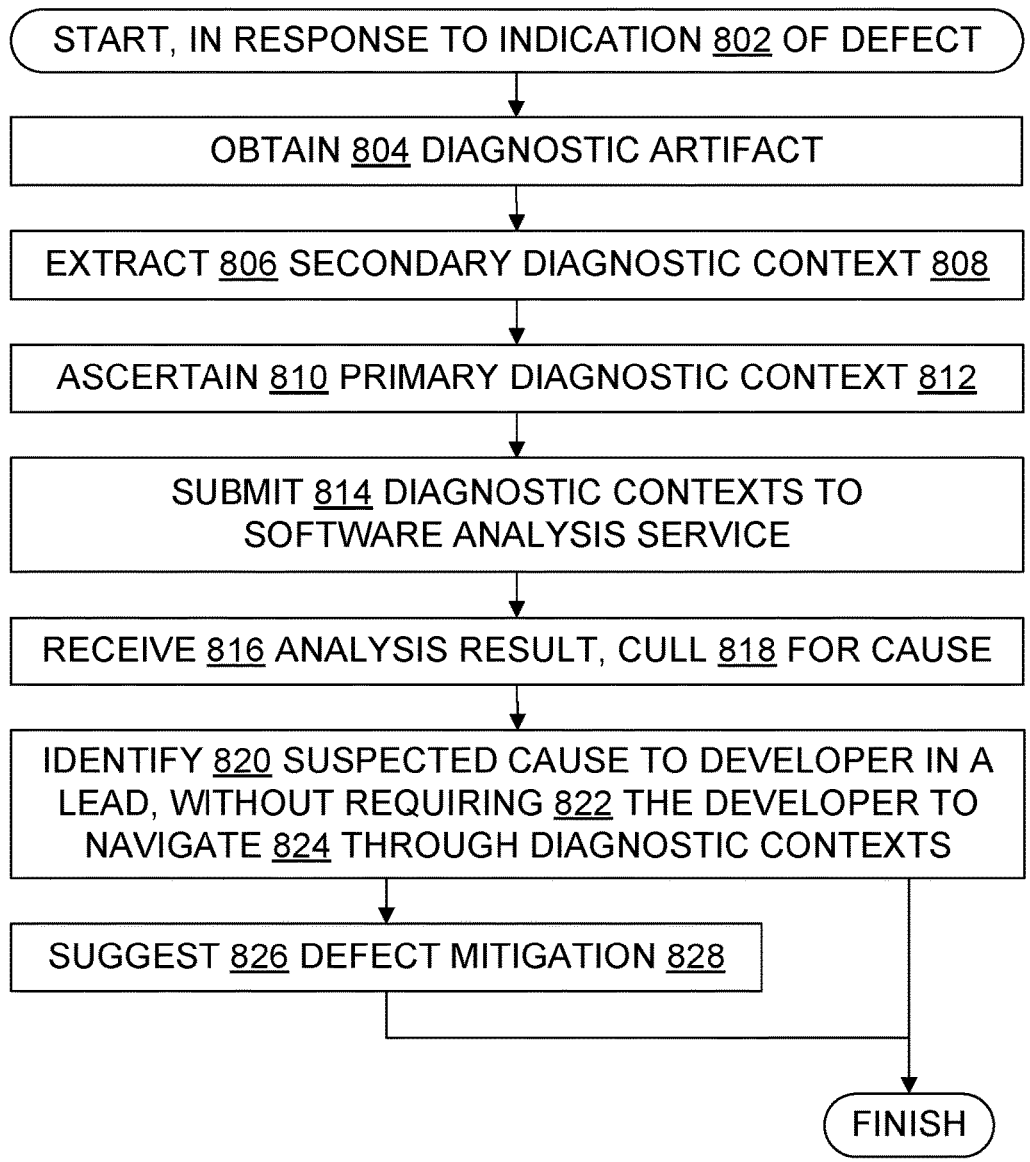
FIG. 7 is a block diagram illustrating some examples of software defect symptoms.
FIG. 8 is a flowchart illustrating steps in some software defect diagnosis methods.

FIG. 7 illustrates some examples of defect symptoms 442. The examples shown include indications 702 that a system 102 or program 206 is out of memory 112, indications 704 that a system 102 or program 206 has become unresponsive and thus some monitor 436 has timed out, null references 606, and indications 706 that a system 102 or program 206 has crashed. These examples are not comprehensive, and they are not necessarily exclusive of one another, e.g., a program may crash when it runs out of memory.

Also, an item may be a symptom 442 in one situation and be an underlying cause 406 in another situation. For example, in a situation S1, a faulty assignment 634 to a loop index variable causes a buffer overrun 638 which overwrites a pointer with zero (nulling the pointer). When an attempt is made to reference memory contents through the null pointer, a Null Reference exception is raised and reported to the developer. In a situation S2, a foobar handle variable is constructed, is given zero as a default value by the constructor, and is then used in an attempt to reference a foobar before any valid foobar has been assigned or attached to the handle. A Null Reference exception is raised, and is reported to the developer. In situation S1, the defect's underlying cause 406 is the faulty assignment, which eventually led to the null reference as a symptom 442. But in situation S2, the underlying cause 406 is the null reference, in combination with the failure to assign a valid foobar.

Some embodiments diagnose 302 a defect 212 in ways consistent with the following overview. A target program is executing (or previously executed, or both) in an execution context 216. At some point, a symptom 442 of a defect 212 is detected. In response, a defect diagnosis method starts, such as the methods shown in FIG. 8 or 9. One or more collection agents 218 may automatically collect diagnostic artifacts 304 associated with the target program 206; use of a collection agent is optional in some embodiments. For instance, some or all of the steps shown in FIG. 8 or FIG. 9 or both could be integrated directly into a live debugger 320 or a time travel debugger 322.

After diagnostic artifacts 304 are collected by an agent 218, or otherwise obtained 804, or concurrently therewith, diagnostic contexts 308 are automatically extracted 806 from the artifacts, including a secondary diagnostic context 808 which includes the defect symptom 442 that triggered execution of the diagnostic method. Extraction may be performed, e.g., by one or more diagnostic context extractors 414.

Some embodiments ascertain 810 a primary diagnostic context 812, which is closer to the underlying cause 406 than the secondary diagnostic context 808 that contains the symptom 442. Examples illustrating how to walk back through an execution's artifacts and contexts to ascertain a more relevant diagnostic context are discussed at several points throughout this disclosure.

Part or all of the diagnostic contexts 308 are automatically submitted 814 to one or more software analysis services 418. The diagnosis software 402 automatically receives 816 analysis results 408 from one or more of the analysis services 418. Suspected causes 406 may be automatically culled 818 from the results, e.g., by discarding error messages and error codes, discarding text or status codes that indicate no cause was found by the analysis, and filtering out other extraneous material that was output by the service(s) 418. Then suspected causes 406 are displayed or otherwise automatically identified 820 to a software developer 104.

In some embodiments, the identification 820 may sometimes be performed directly by an output interface 416 of an analysis service 418. But the other tool interfaces (e.g., decompiler interfaces 410, diagnostic context extractor interfaces 412, analysis service input interface 416) and their corresponding data transfers may be hidden from the developer, e.g., by being excluded 914 from the available navigation 424 options. Likewise, although some original source 208 may be used by some embodiments if it is available, in some cases suspected causes 406 are automatically identified 820 to the developer without requiring 910 the developer to supply original source 208 to the analysis service(s) 418.

Some embodiments suggest 826 defect mitigations 828 to the developer. Mitigations 828 may be suggested by displaying them, or displaying links to them, or displaying summaries of them, along with the suspect cause identification 820. For example, a mitigation 828 for a buffer overflow 638 may display to the developer an example of validation code which can be added (e.g., as a patch or a preprocessor) to the program 206 to check the size of data before the data is written to a buffer. A mitigation 828 for a cause 406 that is not readily patched away or avoided by preprocessing may suggest that the developer use an alternate library which provides similar functionality but has no reported instances of the cause 406 occurring. More generally, particular mitigations 828 will relate to particular causes 406 or sets of causes 406.

Some embodiments use or provide a diagnosis functionality-enhanced system, such as system 400 or another system 102 that is enhanced as taught herein for identifying causes of computing functionality defects. The diagnostic system includes a memory 112, and a processor 110 in operable communication with the memory. The processor 110 is configured to perform computing functionality defect 212 identification steps which include (a) obtaining 804 a diagnostic artifact 304 associated with a computing functionality defect 212 of a program 206, (b) extracting 806 a secondary diagnostic context 308, 808 from the diagnostic artifact, (c) transparently ascertaining a primary diagnostic context 308, 812 which preceded the secondary diagnostic context during an execution of the program, (d) submitting 814 at least a portion of the diagnostic contexts (primary or secondary or both) to a software analysis service 418, (e) receiving 816 from the software analysis service an analysis result 408 which indicates a suspected cause 406 of the computing functionality defect, and (f) identifying 820 the suspected cause to a software developer. Thus, the enhanced system 400 provides the software developer with a debugging lead 422 without requiring the software developer to navigate through the diagnostic contexts. As used here, "transparently ascertaining" means ascertaining 810 without receiving an ascertain-primary-diagnostic-context command per se from the developer and without displaying any extractor 414 interfaces 412 (intake interface, output interface) to the developer.

In some embodiments, ascertaining 810 the primary diagnostic context includes at least one of the following: automatically performing 942 a static data flow analysis, automatically scanning 438 a log 440, or automatically replaying 902 at least a portion of the execution by using a time travel trace 310. In some, data flow analysis may be done 942 backward or forward or both. In some, replaying 902 may be done in reverse or forward or both.

In some embodiments, the memory 112 contains and is configured by the diagnostic artifact 304, and the diagnostic artifact includes at least one of the following: an execution snapshot 306, an execution dump 314, a time travel debugging trace 310, a performance trace 312, a heap representation 318, or executable code 204.

In some embodiments, the memory 112 contains and is configured by symptom-cause pairs 444. For example, e.g., a crash may due to freeing the same memory twice, which may be implemented as a crash symptom 706 paired with a double free cause 622. A hang may be due to thread pool starvation, which may be implemented as a timeout symptom 704 paired with a thread pool starvation cause 602, and so on. In some embodiments, a symptom-cause pair 444 includes a functionality defect symptom 442 that is indicated by a secondary diagnostic context 808, paired with an underlying suspected cause 406 that is supported by the primary diagnostic context 812 and indicated by the analysis result 408.

In particular, in some embodiments the memory 112 contains and is configured by at least one of the following symptom-cause pairs 444 a null reference symptom 606 paired with a faulty assignment cause 634, a null reference symptom 606 paired with a faulty function call result cause 630, a null reference symptom 606 paired with a heap corruption cause 632, a null reference symptom 606 paired with a buffer overrun cause 838, a null reference symptom 606 paired with a reentrant overwrite cause 618, a null reference symptom 606 paired with a wrong database connection string cause 624, a crash symptom 706 paired with a double free cause 622, a crash symptom 706 paired with a use after free cause 626, a crash symptom 706 paired with a reentrant overwrite cause 618, a crash symptom 706 paired with a buffer overrun cause 638, a crash symptom 706 paired with a memory corruption cause 632, a timeout symptom 704 paired with a thread pool starvation cause 602, a timeout symptom 704 paired with an infinite loop cause 616, a timeout symptom 704 paired with a synchronization failure cause 628, a timeout symptom 704 paired with a task completion failure cause 620, or an out of memory symptom 702 paired with an extra event handlers cause 636.

In some embodiments, the system 400 includes at least one of the following diagnostic context extractors 414: a debugger 320, a time travel trace debugger 322, a performance profiler 324, a heap inspector 334, or a decompiler 434.

In some embodiments, the memory 112 contains and is configured by the diagnostic context 308, and the diagnostic context includes at least one of the following: call stacks 326, exception information 338, module state information 346, thread state information 332, task state information 342, or decompiled source 404.

In some embodiments, the system includes the software analysis service 418, and the software analysis service includes or accesses at least one of the following: a machine learning model 506, e.g., a model trained on source to recognize antipatterns, or a lookup mechanism 516 which implements symptom-cause pairing, e.g., a lookup table or a switch statement that builds a set of likely causes for a given symptom.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 9:
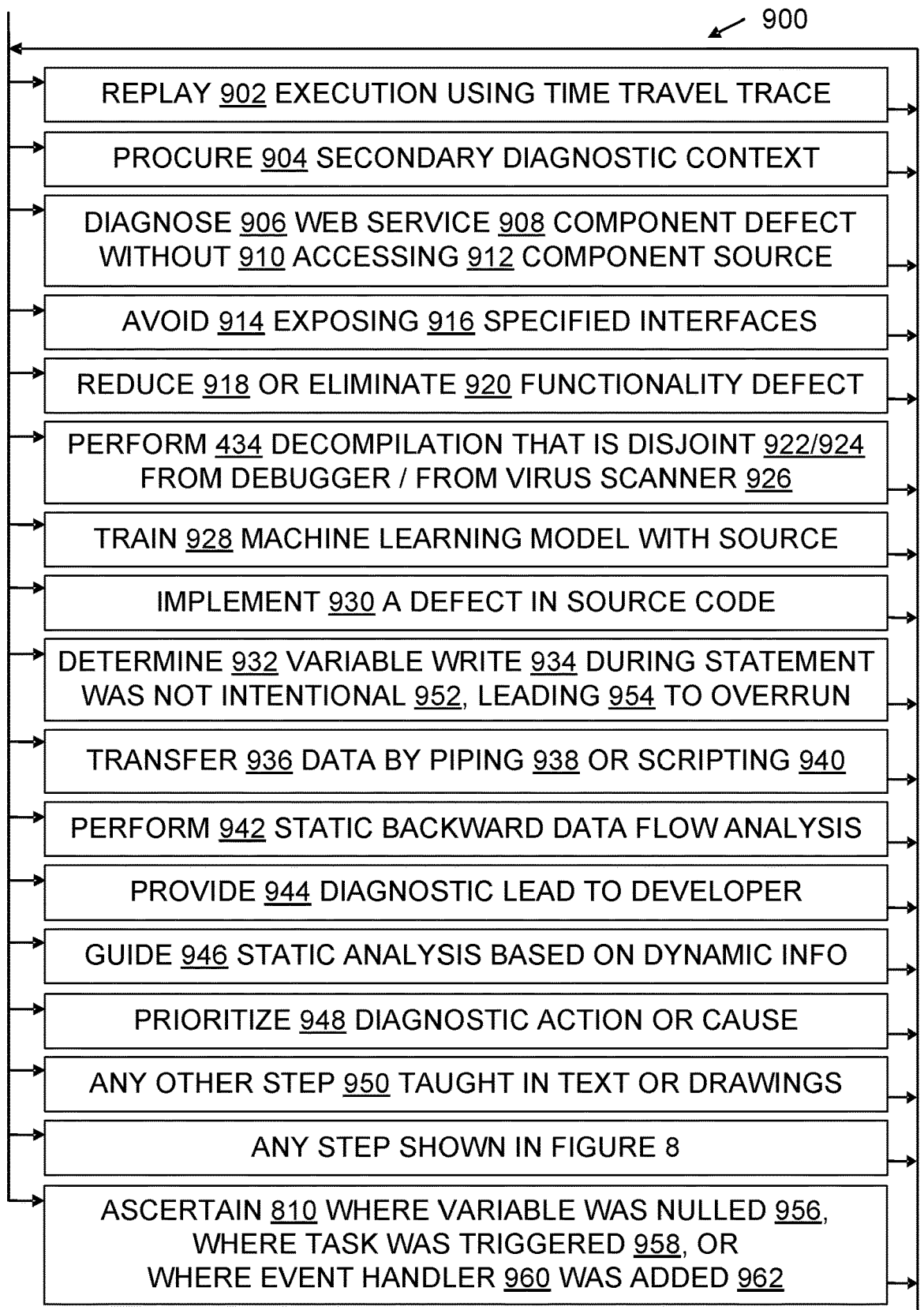
FIG. 9 is a flowchart further illustrating steps in some software defect diagnosis methods.

FIG. 8 illustrates families of methods 800 that may be performed or assisted by an enhanced system, such as system 400, or another defect diagnosis functionality-enhanced system as taught herein. FIG. 9 further illustrates defect diagnosis methods (which may also be referred to as "processes" in the legal sense of that word) that are suitable for use during operation of a system which has innovative functionality taught herein. FIG. 9 includes some refinements, supplements, or contextual actions for steps shown in FIG. 8. FIG. 9 also incorporates steps shown in FIG. 8. Technical processes shown in the Figures or otherwise disclosed will be performed automatically, e.g., by software 402 as part of a development toolchain, unless otherwise indicated. Processes may also be performed in part automatically and in part manually to the extent action by a human administrator or other human person is implicated, e.g., in some embodiments a software developer may specify where software 402 should search for a dump 314 or a trace 310 or 312 to start the diagnostic method. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which control flowchart 800 action items or control flowchart 900 action items are traversed to indicate the steps performed during a process may vary from one performance of the process to another performance of the process. The chart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for identifying causes of computing functionality defects, including the following steps performed automatically: procuring 904 a secondary diagnostic context which is associated with a computing functionality defect of a program, ascertaining 810 a primary diagnostic context of the program which preceded the secondary diagnostic context during an execution of the program, submitting 814 at least a portion of the diagnostic contexts to a software analysis service, receiving 816 (in response to the submitting) from the software analysis service an analysis result which indicates a suspected cause of the computing functionality defect, and identifying 820 the suspected cause to a software developer. This method automatically provides 944 the software developer with a debugging lead without requiring 822 the software developer to navigate 824 through the diagnostic contexts.

With some embodiments, the developer 104 does not need to directly operate the diagnostic context extractor 414, or the decompiler 434, or the scanner 438, or the software analysis service 418. Instead, the diagnostic context extractor interfaces are hidden from the developer, and the decompiler and scanner and other ascertainment 810 tool interfaces are hidden from the developer. In some cases, only the input interface of the software analysis service is hidden; the analysis service output interface is not hidden. This allows the software analysis service to report directly to the developer, in addition to situations where the software analysis service reports to other software 402, 420 that reports 820 in turn to the developer. Specifically, in some embodiments the method avoids 914 exposing 916 any of the following to the software developer during an assistance period which begins with the obtaining 804 and ends with the identifying 820: any diagnostic context extractor user interface 412, any data flow static analyzer 502 user interface 416, and any time travel debugger 322 interface 412.

In some embodiments, the software analysis service 418 or another function of the diagnostic software 402 may provide a fix or make another suggestion that can be given to the developer 104. Specifically, in some embodiments, the method further includes suggesting 826 to the software developer a mitigation 828 for reducing or eliminating the computing functionality defect.

In particular, some embodiments suggest 826 further debugging tools or techniques. For example, when memory corruption 632 or buffer overrun 638 is an identified cause 406, an embodiment may suggest use of Page Heap or another tool or setting that places each heap allocation on the end of a memory page boundary and marks the following page guarded to prevent access, in order to help pinpoint the faulty code in the program 206.

In some embodiments, ascertaining 810 the primary diagnostic context includes at least one of the following: ascertaining where a variable was nulled 956, ascertaining where a task was triggered 958, or ascertaining where an event handler was added 962 to an event source.

For example, when a null reference 606 symptom is part of a secondary diagnostic context and the diagnostic context indicates that the nulled memory was allocated to a variable, ascertaining where in the execution that variable was nulled 956 may provide a more relevant context 308 and perhaps even provide a primary diagnostic context.

Similarly, when a secondary or other non-primary diagnostic context implicates action by a task 340, ascertaining where in the execution that task was triggered 958 may provide a more relevant context 308 and perhaps even provide a primary diagnostic context.

Likewise, when a secondary or other non-primary diagnostic context includes an out of memory symptom 702 and also indicates that event handlers 960 may have been in use, ascertaining where an event handler was added 962 to an event source may reveal that a large number of event handlers were erroneously added 962 to the same event source, allowing the system 400 to identify extra handlers 636 as the cause 406.

In some embodiments, ascertaining 810 the primary diagnostic context includes replaying 902 at least a portion of the execution by using a time travel trace. Each step through the trace 310 yields additional or different context 308.

In some embodiments, a walk back may take the context 308 from an exception 336 back to a point prior to the exception. That is, in some embodiments the secondary diagnostic context 808 includes information 338 about an exception 336 and the primary diagnostic context 812 includes program 206 state (e.g., info 338, 328, 332, 342, or 346) prior to the exception.

Particular symptoms may tend to have a causal link to particular underlying causes, and the diagnosis software 402 may implements pairs 444, decompilation localization, and ascertainment 810 to prioritize 948 analysis based on such actual or likely links.

For example, in some embodiments the procured secondary diagnostic context indicates a null reference symptom 606, and the identified suspect cause accordingly includes at least one of the following higher priority cause candidates: a faulty assignment cause 634, a faulty function call result cause 630, a heap corruption cause 632, a buffer overrun cause 638, a reentrant overwrite cause 618, or a wrong database connection string cause 624.

As another example, in some embodiments the procured secondary diagnostic context indicates a timeout symptom 704, and the identified suspect cause accordingly includes at least one of the following higher priority cause candidates: a thread pool starvation cause 602, an infinite loop cause 616, a synchronization failure cause 628, or a task completion failure cause 620.

Teachings herein may be applied in a wide variety of software environments. In particular, web-facing software in production environments can be very difficult to diagnose, so it may happen that teachings herein provide particularly welcome benefits by finding possible root causes for a bug in a web service third-party library without requiring access to the source code for that library. Thus, with some embodiments, the program 206 includes an executable component 432 which upon execution supports a web service 908, and the computing functionality defect 212 is associated with the executable component.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as defect diagnosis software 402, decompilers 434, diagnostic context extractors 414, log scanners 438, software analysis services 418, and developer interfaces 420, in the form of data 118 and instructions 116, read from a removable storage medium 114 and/or another source such as a network connection, to form a configured storage medium. The configured storage medium 112 is capable of causing a computer system 102 to perform technical process steps for software defect diagnosis, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for identifying causes of computing functionality defects in a program. This method includes: procuring 904 a secondary diagnostic context which is associated with a computing functionality defect of a program; ascertaining 810 a primary diagnostic context of the program which preceded the secondary diagnostic context during an execution of the program; submitting 814 at least a portion of the diagnostic contexts to a software analysis service; in response to the submitting, receiving 816 from the software analysis service an analysis result which indicates a suspected cause of the computing functionality defect; and identifying 820 the suspected cause to a software developer. This method automatically provides the software developer with a debugging lead 422 without requiring the software developer to navigate 824 through the diagnostic contexts.

In some embodiments, the procured secondary diagnostic context indicates a crash symptom 706, and the identified suspect cause accordingly includes at least one of the following higher priority cause candidates: a double free cause 622, a use after free cause 626, a reentrant overwrite cause 618, a buffer overrun cause 638, or a memory corruption cause 632.

In some embodiments, ascertaining 810 the primary diagnostic context includes performing 942 a static backward data flow analysis. This may be done, for example, to determine whether a variable was live at the time when memory allocated to the variable was written 934. If the variable was not live then the diagnostic software 402 may presume that the write was unintentional 952, and accordingly identify 820 a buffer overrun 638 or other memory corruption 632 as a suspect cause 406 of a crash 706.

More generally, in some embodiments the method determines 932 that a variable V was written 934 during execution of a code statement X, determines that X does not involve an intentional assignment 952 to V, and accordingly determines 954 that V was overwritten by a buffer overrun or another memory corruption.

In some embodiments in some situations, the program 206 includes an executable component 432 which upon execution supports a public-facing website 430, and the computing functionality defect 212 is associated with the executable component. By supporting diagnosis even when a developer is not familiar with constituent tools or interfaces discussed herein, an embodiment may facilitate debugging production websites in a timely and effective manner.

In some embodiments, the method includes submitting 814 at least a portion of the diagnostic context to each of a plurality of software analysis services, receiving 816 a respective analysis result from each of at least two software analysis services, and identifying 820 multiple suspected causes to the software developer.

Some Additional Scenarios

In one diagnostic scenario, the method starts after a crash on non-managed code, that is, code in which memory management is the responsibility of a developer instead of being done automatically with garbage collection. In this example, the secondary diagnostic context shows a heap manager crash 706. Walking back 810 from that crash context 308 is done using a memory manager log, which shows that the same memory was freed twice without being allocated in between the two frees; an embodiment may identify 820 this as a double free 622 scenario. In a similar scenario, the walk back 810 is done by reverse replay 902 of an execution trace.

In some other similar scenarios, the size of the allocation and the size of the free are different, e.g., the primary diagnostic context may show an allocation of 48 bytes followed by a free of only 47 of those bytes. In yet other scenarios, walking back 810 leads to a context 812 that includes use of allocated memory after that memory has been freed, that is, a use after free 626 which causes later symptoms such as a crash 706, null reference 606, or hang 704. An embodiment accordingly identifies 820 use after free 626 as a suspected cause.

In some computing systems 102, tasks manage threads on behalf of developers, which is often helpful but also makes bugs inside tasks harder to diagnose for many developers. A task may be asked explicitly to run, or a task may run based on another task's completion, e.g., when a task B is triggered by completion of task A. In some scenarios, walking back 810 from a timeout 704 context 808 leads to a context 812 that shows a task did not run because a predecessor or prerequisite task did not complete. This may be identified 820 by an embodiment as a task completion failure 620 scenario.

Some diagnostic scenarios involve Microsoft Windows® Forms (a.k.a. "WinForms") or other GUI libraries or frameworks, or other event-driven programs 206 (mark of Microsoft Corporation). In normally functioning event-driven code, a single event handler 960 is assigned to handle events from an event source. For example, an event handler may be assigned 962 to handle button press events, mouse click events, or touch screen touch events, or even to handle events that are not directly based on I/O such as tab open events in a browser. In defective code 206, event handlers may be accidentally added to an event source over and over again, which results in an out of memory symptom 702. Walking back 810 through contexts 308 in which event handlers were added 962 then leads an embodiment to identify 820 an extra handlers 636 cause.

In some computing systems 102, developers use a test database during development of a program and then switch to a production database when the program is put into commercial use. Database connections are sometimes specified by database connection strings, which specify a database's location.

Sometimes a developer accidentally fails to change uses of the test database connection string into uses of the production database connection string. As a result, database access authorization fails in the production program's execution, and an exception is raised accordingly, or another symptom occurs. Depending on the program's implementation, the symptom may be a null reference 606 on an object, or a timeout 704, or a crash 706, or a security violation exception 336, for instance. But walking back 810 assignments to the null referenced object, for example, allows an embodiment to correctly identify 820 a wrong database connection 624 as the underlying cause. The walk back in this case may include traversing a database log 440, for example.

In one diagnostic scenario, the method starts after a program 206 times out 704. The method in this example is implemented in an enhanced debugger that gathers artifacts 304, decompiles the program executable, and submits the decompiled source to static analysis tools and machine learning models. The analysis services 418 report that the program timed out waiting for a thread from an empty thread pool 604. This bug lead 422 may be particularly appreciated because thread pool starvation circumstances may be so extreme that they occur only in production when the program is heavily exercised in unexpected ways.

In another scenario, the analysis identifies an unbounded cache 612 as a possible cause 406. Because the diagnosis software 402 in this example performs decompiling with the benefit of a current diagnostic context 308, the diagnosis software 402 can utilize additional information such as the size of the cache or the lifetime of objects, which traditional static analyzers bereft of such context do not utilize.

Another scenario involves synch over async as a root cause 406. This cause results in thread pool starvation 602, as the system running program 206 is blocking threads that are supposed to be handling user requests for the duration of an async task. Static analysis of the source code combined with analysis of the task state and thread state will identify this bug and suggest an appropriate fix, e.g., monitoring synchronous calls, or intentionally making them asynchronous.

Many computing systems use threads 330. In some cases, threads deadlock, e.g., one thread may be waiting indefinitely on a synchronization implemented by a mutex, semaphore, lock, critical section, or some other synchronization item. By walking back 810 changes to that synchronization item, an embodiment may determine that another thread obtained a lock (e.g., entered a mutex) but did not subsequently release its lock. This failure to release a synchronization lock may then be identified 820 by the embodiment as a sync failure 628 that caused a timeout 704.

Some computing systems use reentrant code in a program 206. Debugging such code can be especially difficult because reentrant code does not always behave the way one might expect from reading the code's source. A reentrant routine might include code similar to the following:

```
1   if p != NULL {
2       q = generate-payroll-object(p);
3       print(q.name, q.salary);
4   }
```

That is, if p is not NULL then assign p's payroll object to q and then print the name and salary fields of the payroll object q.

In one scenario, p is not NULL when line 1 is executed, so control passes to line 2. However, a reentrant call to the code could make p NULL after line 1 has executed and before line 2 executes. More generally, reentrant execution may overwrite member variables, local variables, global variable, or other data or instructions, depending on the particularities of an implementation and on whether the implementation contains bugs. Such overwriting may lead to a crash 706 or a null reference 606. Walking back 810 would disclose that p changed 956 during reentrancy, leading to identification of a reentrant overwrite 618 as a cause.

Some scenarios involve finding known buggy code which has been mined out of other code bases. Suitably trained machine learning models can spot such code, even if some modifications have been made to the source that make it different than the training source code.

Some scenarios involve memory leak cause analysis. When the tool 402 sees large counts of dominating objects and increasing memory performance counters, it can search the decompiled source code to find common antipatterns such as unbounded caches, responsive to information derived from the allocation stacks and source code analysis.

Some diagnostic scenarios involve automatically detecting common antipatterns when examining diagnostic artifacts such as dumps or performance traces. Given a diagnostics artifact (crash dump, performance trace, time travel debugging trace, snapshot, etc.) derived from, for example, an async-void hang or a null reference crash, an embodiment provides features and abilities to perform operations such as the following: determine the correct call stack from which the issue derived, use the call stack to record a specific Time Travel Debugging trace to the origins of the issue, run a series of bots 418 over all the diagnostics artifacts to generate suggested explicit fixes to the source code. Once a root cause is identified, an embodiment may would also analyze the code for other as yet undetected, but related issues and antipatterns.

In some scenarios, an embodiment allows developers with less technical expertise than was previously required to analyze issues in production and resolve them. Unlike some other approaches, with some embodiments according to teachings herein a developer is not required to interpret raw data of diagnostics artifacts 304 in order to reason about the root cause. Instead, an embodiment may show the developer the root cause based on automated analysis. In particular, use of automatic walk back 810 as taught herein to select more relevant contexts 308 makes analysis more efficient and more effective.

In some scenarios, an embodiment provides an enhanced diagnostic experience, in that diagnostic tools don't merely show symptoms to the investigating developer, but instead identify a root cause and give suggestions for a fix. This experience may be driven by expert systems, and machine learning based algorithms, changing developers' experience of code analysis and bug reports.

Unlike a purely static analysis, the analysis performed by some embodiments uses dynamic information to guide 946 a source-based static analysis. For example, a dump of thread information may indicate that the thread pool is empty, causing the source-based analyzer to check the decompiled source for a sync-over-async pattern. As another example, call stack information or other dynamic information can be used to guide decompilation, so that computational resources are not wasted decompiling portions of the program that have little or no relevance to the program's failure, and likewise computational resources are not wasted performing static analysis on irrelevant portions of the program. The walk back 810 capability, combined with dynamic diagnostic data such as call stacks, thread lists, task lists, and the like, allow the enhanced system to show the developer the root cause based on the best available evidence of what happened during an execution.

Additional Aspects Involving Decompilation

In some embodiments, a system 400 resides and operates on one side of a trust boundary 202, and no source code 208 of the program 206 other than decompiled source 404 resides on the same side of the trust boundary as the diagnostic system. Some of these embodiments perform automatic decompilation to obtain decompiled source 404 for analysis 418. Some embodiments in some situations automatically extract 806 a symbol table 214 or other symbol data 214 from an executable, or from a debug info file. In some embodiments, program executable 204 is automatically fed to a decompiler 434, thus allowing the embodiment to get decompiled source 404. When symbols 214 are available, they may also be automatically fed to the decompiler 434, which may then use the symbols to produce decompiled source 404 that is closer in content to the original source 208 than would otherwise be produced by decompilation. In particular, managed code metadata may include symbols 214 which give the names of classes and methods. When symbols 214 are not available, human-meaningful defaults may be used, e.g., local variables in a routine may be named "local1", "local2", and so on.

Decompilation 434 is considered here a technical action. Like other technical actions, when decompilation is done in particular circumstances it may also have a legal context, e.g., decompilation may implicate a license agreement, or it may implicate one or more statutes or doctrines of copyright law, or both. Such considerations are beyond the scope of the present technical disclosure. The present disclosure is not meant to be a grant or denial of permission under an end user license agreement, for example, and is not presented as a statement of policy or law regarding non-technical non-patent aspects of decompilation.

In some embodiments, decompilation 434 is automatically localized in view of the diagnostic context. For example, instead of decompiling an entire executable 204, portions of the executable may be iteratively decompiled and analyzed 814. If the diagnostic context 308 includes a stack return address, for instance, then executable code at that location may be decompiled first, or at least have higher priority 948 for decompilation. If the diagnostic context includes a hard-coded file name or URL as part of a file or URL access attempt which apparently failed, then executable code 204 may be scanned for the file name or URL, and portions of the executable surrounding instances of the file name or URL may receive higher priority for decompilation. If the diagnostic context 308 includes a list of active thread IDs and an indication that a defect 212 involving threads may have occurred, then portions of the executable surrounding instances of those thread IDs, or executable portions surrounding identifiable thread operations such as thread creation or interthread messaging, may receive higher priority for decompilation. More generally, information in a diagnostic context 308 may be used to automatically guide 946 diagnostic decompilation toward particular portions of an executable.

In some embodiments, some or all of the decompiled source 404 is automatically submitted 814 to one or more source-based software analysis services 418. The same source 404 may be submitted to different analysis services 418, or different parts of the source 404 may be submitted to different analysis services 418. If some original source 208 is available, it may also be submitted 814 for analysis. That is, depending on the circumstances, the decompiled source 404 may be used as a replacement for unavailable original source 208, as a supplement to fill gaps in the available original source 208, or as a replacement for some of the original source and a supplement to fill in gaps between pieces of original source. In some embodiments, submitting 814 includes submitting at least a portion of the decompiled source 404 to at least one of the following analysis services 418: a machine learning model 506 trained using source codes, or a neural network 508 trained using source codes.

In some embodiments, a source-based software analysis service 418 includes a machine learning model that was trained using source code examples of a particular defect 212, e.g., source code examples of a null reference 606. Thus, submitting 814 may include submitting at least a portion of the decompiled source to a machine learning model trained 928 using multiple source code implementations of the computing functionality defect, and the decompiled source may also implement 930 the computing functionality defect, allowing detection of that defect by the trained model.

In some embodiments, decompiling 434 is disjoint 922 from any debugger 320, 322. In some, decompiling 434 is disjoint 924 from any virus scanner 926. In some, decompiling 434 is disjoint 922, 924 from debuggers and from virus scanners. An operation X is "disjoint" from a tool Y when X is not launched by Y and when execution of Y is not reliant upon performance of X.

In some embodiments, the method includes transferring 936 at least a portion of the diagnostic context from a diagnostic context extractor to a decompiler or other tool. In some, it includes transferring 936 at least a portion of the decompiled source from the decompiler to the source-based software analysis service. Some methods include both transfers. In any of these, the transferring 936 may be performed using piping 938, or scripting 940, or both.

In some embodiments, transparently getting a decompiled source includes transparently feeding a decompiler some symbol information 214 of the program. Here as elsewhere in this document, "transparently" means taking action in a way that is transparent to (unseen by) the developer, although the effects of transparent actions may be visible to the developer. In some, identifying 820 the suspected cause to the software developer includes displaying decompiled source to the software developer. But in some other embodiments, the method avoids displaying decompiled source to the software developer.

Additional Details, Examples, and Observations

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as software defect diagnosis, trace file replay, log scanning, decompilation, extraction of internal software context, and automated analysis based on program source code, which are each an activity deeply rooted in computing technology. Some of the technical mechanisms discussed include, e.g., log scanners, symptom-cause pairs, decompilers, pipes, scripts, heaps, stacks, threads, and exceptions. Some of the technical effects discussed include, e.g., selection of diagnostic contexts closer to an underlying defect cause, antipattern detection, machine learning training, provision of software defect diagnostic leads, avoidance of reliance on original source code, localization of decompilation, and focused navigation which hides specified interfaces. Thus, purely mental processes are clearly excluded. Other advantages based on the technical characteristics of the teachings will also be apparent to one of skill from the description provided.

Some embodiments described herein may be viewed by some people in a broader context. For instance, concepts such as analysis, clues, context, corrections, deficiencies, and learning may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to automatically provide useful diagnostic leads to help developers understand and improve software functionality. Other configured storage media, systems, and processes involving analysis, clues, context, corrections, deficiencies, or learning are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, machine learning models, programming languages, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol; unless otherwise stated, HTTP includes HTTPS herein
HTTPS: hypertext transfer protocol secure
IaaS or IAAS: infrastructure-as-a-service
ID: identification or identity
IDE: integrated development environment
IoT: Internet of Things
LAN: local area network
LDAP: lightweight directory access protocol
OS: operating system
PaaS or PAAS: platform-as-a-service
RAM: random access memory
ROM: read only memory
SAST: static application security testing SIEM: security information and event management; also refers to tools which provide security information and event management
SQL: structured query language
TPU: tensor processing unit
UEFI: Unified Extensible Firmware Interface
URI: uniform resource identifier
URL: uniform resource locator
VM: virtual machine
WAN: wide area network
XSS: cross-site scripting
XXE: XML eXternal Entity Injection Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Defect diagnosis operations such as decompilation, static analysis, antipattern scanning, piping, script execution, and many other operations discussed herein, are understood to be inherently digital. A human mind cannot interface directly with a CPU or other processor, or with RAM or other digital storage, to read and write the necessary data to perform the software diagnosis steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, adding, analyzing, ascertaining, assigning, collecting, decompiling, determining, diagnosing, displaying, eliminating, extracting, feeding, identifying, implementing, localizing, navigating, obtaining, performing, prioritizing, procuring, providing, receiving, reducing, replaying, submitting, suggesting, training, transferring, triggering, writing (and accesses, accessed, adds, added, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users, e.g., software developers
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
202 trust boundary, e.g., a boundary around digital assets or around a computing system which stores or provides access to digital data or computing hardware or another digital asset; a trust boundary may be implemented, e.g., as cybersecurity controls which prevent access to a digital asset unless a would-be accessor demonstrates possession of proper authentication and authorization credentials 204 program executable; unless otherwise indicated, an executable includes binary code, such as native code or binary code that runs as managed code 206 target program, namely, a program which apparently has a defect 212 and therefore is a target of diagnosis 302 efforts; a target program may also be referred to simply as a "program" when context indicates that the program is subject to a defect diagnosis effort 208 source code from which an executable 204 was compiled or otherwise generated; not to be confused with decompiled code 404 which is generated from an executable 212 a functionality defect in target program software or in a system running such software; defects may manifest as an erroneous or undesired course of computation, as insufficient or incorrect results, as undesired termination, as deadlocking, as an infinite loop, as inefficient use of processor cycles or memory space or network bandwidth or other computational resources, as undesirable complexity or vagueness in a user interface, as a security vulnerability, or as any other evident deficiency or shortcoming or error 214 symbol table, e.g., a data structure created by a compiler which associates identifiers with data type information and other information that was included in source code 208 which declared or defined the variables, routines, or other items that are named by the identifiers 216 execution context, e.g., a runtime, an embedded system, or a real-time system; an execution context may also include context such as "web server", "cloud", "production", etc.

218 collection agent, e.g., part of a diagnosis enhancement software 402 that collects diagnostic artifacts 304, e.g., by copying them to a working directory or creating links to them, or both 300 aspect of software diagnosis 302 software defect diagnosis; may also be referred to as "software diagnosis" or simply as "diagnosis"; includes, e.g., efforts to identify root causes of defects 212; numeral 302 also refers to an act of diagnosing software, e.g., by performing operations according to one or more of FIGS. 7, 8, and 9

304 diagnostic artifact, e.g., an execution snapshot, an execution dump, a time travel debugging trace, a performance trace, or a heap representation 306 an execution snapshot, e.g., an in-memory copy of a process that shares memory allocation pages with the original process via copy-on-write 308 diagnostic context, e.g., call stacks, exception information, module state information, thread state information, or task state information; generally will be from a single point in a program's execution, but a diagnostic context 308 may include state information from multiple points in an execution, such as before and after an assignment, or when memory is allocated and when that memory is freed 310 debug trace, e.g., execution states captured in a time travel trace that can be replayed in forward or in reverse, or execution states captured in a non-time-travel trace; suitable tracing technology to produce a trace 310 may include, for instance, Event Tracing for Windows (ETW) tracing (a.k.a. "Time Travel Tracing" or known as part of "Time Travel Debugging") on systems running Microsoft Windows® environments (mark of Microsoft Corporation), LTTng® tracing on systems running a Linux® environment (marks of Efficios Inc. and Linus Torvalds, respectively), DTrace® tracing for UNIX®-like environments (marks of Oracle America, Inc. and X/Open Company Ltd. Corp., respectively), and other tracing technologies 312 performance trace, e.g., a trace with execution states that relate specifically to program performance such as memory usage, I/O calls, cycles in a given thread state (running, suspended, etc.), execution time, and so on 314 dump, e.g., a copy of memory contents or other data at a particular point in time; may include a serialized copy of a process; a dump is often stored in one or more files 316 heap, e.g., an area of memory from which objects or other data structures are allocated during program execution 318 heap representation, e.g., a graph or other data structure representing a garbage collection heap or representing a program's usage of a managed heap 320 debugger 322 debugger with functionality to use time-travel traces 324 profiler, e.g., a program that obtains samples of resource usage data during program execution 326 callstack; may also be referred to as "call stack"

328 info about a callstack, e.g., a snapshot of a call stack or statistics about call stacks 330 thread 332 info about a thread, e.g., a snapshot of a thread or statistics about threads 334 heap inspector tool, e.g., software which converts raw data about a heap into graphical or statistical information; a heap inspector may inspect a heap 316 for memory leaks, e.g., patterns such as event handler leaks 336 execution exception, e.g., attempt to divide by zero, attempt to access data or code at an invalid address, developer-defined exceptions, and other interruptions in normal execution flow of a program 338 info about an exception, e.g., a snapshot of execution state associated with an exception, or statistics about exceptions 340 task, e.g., a collection of threads 342 info about a task, e.g., a snapshot of a task or statistics about tasks 344 module, e.g., a collection of objects or a library 346 info about a module, e.g., a snapshot of state associated with a module, or statistics about modules 400 example defect diagnosis system 402 defect diagnosis enhancement software 404 decompiled source code; not to be confused with the source code 208 that was originally compiled to create an executable 204 of interest 406 suspected or actual cause of a defect 212, e.g., thread pool starvation, null reference, memory leak; 406 may refer to a root cause or to a result of the root cause which created additional unwanted program behavior 408 result of source-based software analysis, e.g., output from a source-based software analysis service 410 decompiler interface; may be an intake interface, an output interface, or 410 may refer to both interfaces 412 diagnostic context extractor interface; may be an intake interface, an output interface, or 412 may refer to both interfaces 414 diagnostic context extractor, e.g., a debugger, a time travel trace debugger, a performance profiler, or heap inspector 416 source-based software analysis service interface; may be an intake interface, an output interface, or 416 may refer to both interfaces 418 source-based software analysis service, e.g., a static analysis tool, a statistical analysis tool, a machine learning model trained using source codes, or a neural network trained using source codes; some examples in a given embodiment may also include Microsoft .NET Compiler Platform so-called "Roslyn" analyzers, and Microsoft Program Synthesis using Examples (PROSE) tools 420 developer interface 422 debugging lead 424 focused navigation, e.g., navigation which is constrained in a specified way 426 integrated development environment 428 integrated development environment extension; may also be called a "plug-in", "plugin", "add-in", "addin", "add-on", or "addon"

430 web component, e.g., a separately compilable portion of a public-facing website 432 program component, e.g., a separately compilable module, file, library, or other portion of a target program 434 decompiler; reference numeral 434 may also refer to decompiling, namely, an act of performing decompilation 436 service generally; a service may be, e.g., a consumable program offering, in a cloud computing environment or other network or computing system environment, which provides resources to multiple programs or provides resource access to multiple programs, or does both; for present purposes tools 122 are considered to be examples of services 438 log scanner or other log analysis tool; may be, e.g., a SIEM tool;
numeral 438 also refers to the act of scanning a log, which may include parsing 440 log, e.g., a chronological list of events or transactions 442 symptom of a software defect, e.g., an initial indication that some unknown defect is present 444 pairing of a symptom 442 and an underlying cause 406

502 static analysis tool, e.g., a tool which analyzes source code without the benefit of dynamic information such as whether an exception occurred or what a call stack snapshot contains; such tools are adapted for use herein in some embodiments by virtue of guiding static analysis in view of dynamic information 504 static analysis of source code, e.g., analysis based on source code alone 506 machine learning model, e.g., neural network, decision tree, regression model, support vector machine or other instance-based algorithm implementation, Bayesian model, clustering algorithm implementation, deep learning algorithm implementation, or ensemble thereof; a machine learning model 506 may be trained by supervised learning or unsupervised learning, but is trained at least in part based on source code as training data; the machine learning model may be trained at least in part using data obtained by harvesting source code history and corresponding bug information from various code bases to discover anti-patterns 508 neural network; a particular example of a machine learning model 506

510 antipattern scanner, e.g., a tool that scans source code looking for implementations of one or more particular antipatterns 512 antipattern, e.g., a software programming pattern which is risky or disfavored, such as a sync-over-async pattern, buffer overflow pattern, non-validated input pattern, improper string termination pattern, and many others 514 static application security testing (SAST) tools, e.g., tools which check for security vulnerabilities such as SQL injections, LDAP injections, XXE, cryptography weakness, or XSS 516 lookup mechanism that matches symptoms 442 with plausible or likely underlying causes 406 based on predetermined pairings 444; may include e.g., a table, graph, state machine, or other data structure that matches crash symptoms to causes such as double free, use after free, and buffer overrun; numeral 516 may also refer to use of the mechanism to perform a lookup action 602 thread pool starvation, e.g., the thread pool is empty because all available threads have been allocated, and a request for another thread therefore fails 604 thread pool 606 null reference, e.g., a pointer unexpectedly is null 608 memory leak, e.g., some allocated memory is not freed after it is no longer in use, and as a result a request for memory failed 610 exploited security vulnerability, e.g., failure to validate data, authentication failure, inadvertent exposure of sensitive data, cross-site scripting, unchanged default account settings, insecure deserialization, cross-site request forgery, and so on 612 unbounded cache growth 614 faulty navigation link, e.g., incorrect hyperlink, incorrect linkage of button to button press handler, and so on 616 an infinite loop, e.g., a loop whose termination condition is never met 618 a reentrant overwrite, e.g., a write to a memory location which occurs as a result of re-entrance into a routine 620 a task completion fail, e.g., failure of a task to complete as expected 622 a double free, e.g., two frees of the same memory without an intervening allocation of that memory 624 a wrong database connection, e.g., a production software's attempt to connect to a test or development database instead of connecting to a production database 626 a use after free, e.g., a thread X writing to memory after that memory has been freed by X and reallocated to a thread Y 628 a synchronization failure, e.g., a deadlock or a failure to free a lock that is used for thread or task synchronization 630 a bad function call result, e.g., when a function returns a value that is larger in memory storage size than the size of a variable to which the return value is assigned 632 a memory corruption, e.g., an errant write to memory; when the write violates integrity of heap-related data structures, this is a particular kind of memory corruption known as a heap corruption 634 a faulty assignment, e.g., an assignment that writes a variable even though the corresponding source code does not indicate that the variable could be written during some valid execution path 636 extra event handlers, e.g., assigning more than one event handler to a given event source 638 a buffer overrun, e.g., writing that fills a memory buffer and then overflows beyond the defined limit of the buffer 702 out of memory symptom, e.g., an error code, error message, exception, alert, or other indication that a computing system or a program lacks the memory it requests to perform as desired and designed 704 timeout symptom, e.g., an error code, error message, exception, alert, or other indication that a computing system or a program is running extremely slower than intended or is completely unresponsive; a monitor may timeout when a program it is monitoring crashes; a program that timed out may have crash but not necessarily, e.g., it may be waiting for a response 706 crash symptom, e.g., an error code, error message, exception, alert, or other indication that a computing system or a program is no longer running 800 flowchart; 800 also refers to defect diagnosis methods illustrated by or consistent with the FIG. 8 flowchart 802 indication of a defect 212, e.g., a symptom 442 such as a program crash, program timeout, or unexpected exception, or a another indication such as a diagnosis assistance request from a developer to a diagnostic system 400

804 obtain artifact, e.g., by locating the artifact in a file system or in a memory 806 extract diagnostic context 308 from an artifact 304, e.g., by invoking extraction functionality such as that used in extractors 414

808 secondary diagnostic context, e.g., one that includes the presenting symptom 442

810 automatically and proactively ascertain a primary diagnostic context from a non-primary diagnostic context, e.g., by data flow analysis, time travel trace replay, backward traversal of a log, localization of decompilation, or a combination of such techniques; an embodiment may automatically "walk back" (i.e., ascertain earlier context) from a secondary diagnostic context that involves a symptom to find an earlier primary diagnostic context which is then analyzed to identify a suspected root cause; ascertaining may be done "transparently" with respect to a developer, e.g., without displaying walk-back details to the developer or requiring manual navigation to extraction and analysis tools by the developer 812 primary diagnostic context, e.g., one that precedes a secondary diagnostic context and includes a different symptom or an underlying cause 814 submit diagnostic context to an intake interface of a software analysis service 816 receive analysis results from an output interface of a software analysis service 818 cull analysis results to locate descriptions of causes 406, e.g., by parsing or keyword searches 820 identify a cause, e.g., by displaying it, writing it to a file, or sending it to a developer interface 420

822 avoid requiring a developer to manually examine any details of contexts when such details are neither symptoms nor causes 824 navigate through a diagnostic context, e.g., by manually using an intake interface of an analysis service 418

826 suggest a defect mitigation to a developer, e.g., by displaying a description of the mitigation, writing it to a file, or sending it to a developer interface 420

828 defect mitigation, e.g., suggested patch, suggested source code edit, suggested alternate library, suggested change in configuration, suggested throttling, suggested monitoring of data transfer or computational resource, or another mechanism or action which may reduce 918 or eliminate 920 the adverse impact of a defect 212

900 flowchart; 900 also refers to defect diagnosis methods illustrated by or consistent with the FIG. 9 flowchart (which incorporates the steps of FIG. 8)

902 replay (forward or reverse) execution using a time travel trace 904 procure a diagnostic context, e.g., by extracting 806 the diagnostic context from an artifact or by using a previously extracted diagnostic context 906 diagnose a defect, e.g., by finding and identifying a cause 406

908 web service, e.g., an interface or resource available through HTTP or HTTPS 910 avoid accessing original source code 208 of a component 912 access original source code 208 of a component 914 avoid exposing a service or tool interface to a developer, e.g., by hiding the data transfers to or from the interface 916 expose a service or tool interface to a developer, e.g., by displaying to a developer the interface itself or the data transfers to or from the interface 918 reduce adverse impact of a defect 212, e.g., reduce the amount of memory leaked, increase the computation required to exploit a security vulnerability, reduce the frequency of an unwanted exception, and so on 920 eliminate an adverse impact of a defect 212, as opposed to merely reducing 918 such impact 922 be disjoint from a debugger; operate without being launched by a debugger and without relying on debugger execution (debugger execution may be permitted, but is not required)

924 be disjoint from a virus scanner; operate without being launched by a virus scanner and without relying on virus scanner execution (virus scanner execution may be permitted, but is not required)

926 virus scanner; may also be referred to as an "antivirus scanner", "antivirus tool", or "antivirus service", or "virus detector"

928 train a machine learning model, e.g., perform familiar training techniques for a given kind of machine learning model, e.g., obtain data, prepare data, feed data to model, and test model for accuracy 930 implement a defect in source code, e.g., synchronously invoke a component which has an asynchronous implementation, fail to check data's size before writing the data to a buffer, and so on 932 determine that a value was written to memory assigned to a variable; may be done intentionally (e.g., source says something like "x:=2;" or "x=2") or unintentionally (e.g., by a buffer overrun or other memory corruption)

934 write a value to memory assigned to a variable 936 transfer data to an intake interface or from an output interface 938 transfer data, or enable data transfer, at least in part by piping data from one tool or other service to another tool or other service 940 transfer data, or enable data transfer, at least in part by invoking one tool or other service in a script and then invoking another tool or other service in the script 942 perform static backward data flow analysis
944 provide diagnostic assistance to a developer; display a lead 422
946 use dynamic information 308 to guide a source-based static analysis
948 prioritize possible causes or analysis actions
950 any step discussed in the present disclosure that has not been assigned some other reference numeral
952 determine that a write to memory allocated to a variable was not an intentional write
954 conclude that a write to memory was a result of a buffer overrun or other memory corruption
956 null a variable, e.g., write a zero value to the memory allocated to the variable
958 trigger a task; may also be referred to as triggering execution of a thread of a task
960 event handler, e.g., code designed to handle an event such as an alert, interrupt, or exception
962 add an event handler to a source of events, that is, link the handler and the source such that events are fed to the handler for handling

CONCLUSION

In short, the teachings herein provide a variety of computing system 102 defect 212 diagnosis 302 functionalities which enhance the identification of causes 406 underlying unwanted problems or deficiencies in software 206. Analytic focus is automatically walked back 810 from an initial symptomatic 442 diagnostic context 808, 308 to a previous diagnostic context 812, 308 which is more informative about underlying causes 406. Static analysis 504 services and other diagnostic tools 418 and techniques 418 are applied on behalf of a developer 104. Diagnosis 302 may obtain 804 diagnostic artifacts 304, extract 806 diagnostic context 308 from the artifacts, decompile 434 at least part of the target program 206 to get source 404, lookup 516 pairs 444 of symptoms 442 and respective likely causes 406, scan 438 logs 440, and submit 814 decompiled source 404 and other diagnostic context 308 to software analysis services 418.

An analysis service 418 may be a static analysis tool 502, a SAST tool 514, an antipattern scanner 510, or a neural network 508 or other machine learning model 506 trained on source code, for example. The diagnostic context 308 may guide 946 the analysis, e.g., by localizing 810 decompilation or prioritizing 948 possible causes. Likely causes 406 are culled 818 from analysis results 408 and identified 820 to a software developer 104. Changes 828 to mitigate 918 or 920 the defect's impact are suggested 826 in some cases. Thus, the software developer receives debugging leads 422 without 822 manually navigating through tool interfaces 410, 412, 416. Another advantage of some embodiments is that they tell the user 104 not merely that a bug 406 was detected 408 by static analysis 418, but also that the application 206 is actually experiencing issues 212 because of that bug. This enables a developer 104 to diagnose issues 212 that they don't necessarily have the expertise to diagnose otherwise.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into diagnostic software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 through 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system for identifying causes of computing functionality defects, the system comprising:
   a memory;
   a processor in operable communication with the memory, the processor configured to perform computing functionality defect identification steps which include (a) obtaining a diagnostic artifact associated with a computing functionality defect of a program, (b) extracting a secondary diagnostic context of an execution of the program in an execution context from the diagnostic artifact, (c) transparently ascertaining a primary diagnostic context of the program which preceded the secondary diagnostic context during the execution of the program in the execution context, (d) submitting at least a portion of diagnostic contexts of the execution in the execution context to a software analysis service, wherein the diagnostic contexts include the ascertained primary diagnostic context and the secondary diagnostic context, (e) receiving from the software analysis service an analysis result which indicates a suspected cause of the computing functionality defect, and (f) identifying the suspected cause to a software developer;
   whereby the system provides the software developer with a debugging lead without requiring the software developer to navigate through the diagnostic contexts.

2. The system of claim 1, wherein transparently ascertaining the primary diagnostic context comprises at least one of the following:
   automatically performing a static data flow analysis;
   automatically scanning a log; or
   automatically replaying at least a portion of the execution by using a time travel trace.

3. The system of claim 1, wherein the memory contains and is configured by the diagnostic artifact, and the diagnostic artifact includes at least one of the following: an execution snapshot, an execution dump, a time travel debugging trace, a performance trace, a heap representation, or executable code.

4. The system of claim 1, wherein the memory contains and is configured by data indicating at least one of the following symptom-cause pairs:
   a null reference symptom paired with a faulty assignment cause;
   a null reference symptom paired with a faulty function call result cause;
   a null reference symptom paired with a heap corruption cause;
   a null reference symptom paired with a buffer overrun cause;
   a null reference symptom paired with a reentrant overwrite cause;
   a null reference symptom paired with a wrong database connection string cause;
   a crash symptom paired with a double free cause;
   a crash symptom paired with a use after free cause;

a crash symptom paired with a reentrant overwrite cause;
a crash symptom paired with a buffer overrun cause;
a crash symptom paired with a memory corruption cause;
a timeout symptom paired with a thread pool starvation cause;
a timeout symptom paired with an infinite loop cause;
a timeout symptom paired with a synchronization failure cause;
a timeout symptom paired with a task completion failure cause; or
an out of memory symptom paired with an extra event handlers cause.

5. The system of claim 1, wherein the system comprises at least one of the following diagnostic context extractors: a debugger, a time travel trace debugger, a performance profiler, a heap inspector, or a decompiler.

6. The system of claim 1, wherein the memory contains and is configured by the diagnostic contexts, and the diagnostic contexts include at least one of the following: call stacks, exception information, module state information, thread state information, task state information, or decompiled source code.

7. The system of claim 1, wherein the system further comprises the software analysis service, and the software analysis service includes or accesses at least one of the following:
a machine learning model; or
a lookup mechanism which implements symptom-cause pairing.

8. A method for identifying causes of computing functionality defects, the method comprising automatically:
procuring a secondary diagnostic context of an execution of a program in an execution context, the secondary diagnostic context associated with a computing functionality defect of the program;
ascertaining a primary diagnostic context of the program which preceded the secondary diagnostic context during the execution of the program in the execution context;
submitting at least a portion of diagnostic contexts of the execution in the execution context to a software analysis service, wherein the diagnostic contexts include the ascertained primary diagnostic context and the secondary diagnostic context;
in response to the submitting, receiving from the software analysis service an analysis result which indicates a suspected cause of the computing functionality defect; and
identifying the suspected cause to a software developer;
whereby the method automatically provides the software developer with a debugging lead without requiring the software developer to navigate through the diagnostic contexts.

9. The method of claim 8, wherein the method avoids exposing any of the following to the software developer during an assistance period which begins with the procuring and ends with the identifying: any diagnostic context extractor user interface, any data flow static analyzer user interface, and any time travel debugger interface.

10. The method of claim 8, further comprising suggesting to the software developer a mitigation for reducing or eliminating the computing functionality defect.

11. The method of claim 8, wherein ascertaining the primary diagnostic context comprises at least one of the following:
ascertaining where a variable was nulled;
ascertaining where a task was triggered; or
ascertaining where an event handler was added to an event source.

12. The method of claim 8, wherein ascertaining the primary diagnostic context comprises replaying at least a portion of the execution by using a time travel trace.

13. The method of claim 8, wherein the secondary diagnostic context includes information about an exception and the primary diagnostic context includes program state prior to the exception.

14. The method of claim 8, wherein the procured secondary diagnostic context indicates a null reference symptom, and the identified suspect cause accordingly includes at least one of the following higher priority cause candidates:
a faulty assignment cause;
a faulty function call result cause;
a heap corruption cause;
a buffer overrun cause;
a reentrant overwrite cause; or
a wrong database connection string cause.

15. The method of claim 8, wherein the procured secondary diagnostic context indicates a timeout symptom, and the identified suspect cause accordingly includes at least one of the following higher priority cause candidates:
a thread pool starvation cause;
an infinite loop cause;
a synchronization failure cause; or
a task completion failure cause.

16. A computer-readable storage medium configured with data and instructions which upon execution by a processor cause a computing system to perform a method for identifying causes of computing functionality defects in a program, the method comprising:
procuring a secondary diagnostic context of an execution of a program in an execution context, the secondary diagnostic context associated with a computing functionality defect of the program;
ascertaining a primary diagnostic context of the program which preceded the secondary diagnostic context during the execution of the program in the execution context;
submitting at least a portion of diagnostic contexts of the execution in the execution context to a software analysis service, wherein the diagnostic contexts include the ascertained primary diagnostic context and the secondary diagnostic context;
in response to the submitting, receiving from the software analysis service an analysis result which indicates a suspected cause of the computing functionality defect; and
identifying the suspected cause to a software developer;
whereby the method automatically provides the software developer with a debugging lead without requiring the software developer to navigate through the diagnostic contexts.

17. The storage medium of claim 16, wherein the procured secondary diagnostic context indicates a crash symptom, and the identified suspect cause accordingly includes at least one of the following higher priority cause candidates:
a double free cause;
a use after free cause;
a reentrant overwrite cause;
a buffer overrun cause; or
a memory corruption cause.

18. The storage medium of claim 16, wherein ascertaining the primary diagnostic context comprises performing a static backward data flow analysis.

19. The storage medium of claim 16, wherein the program includes an executable component which upon execution supports a public-facing website, and the computing functionality defect is associated with the executable component.

20. The storage medium of claim 16, wherein the method determines that a variable V was written during execution of a code statement X, determines that X does not involve an intentional assignment to V, and accordingly determines that V was overwritten by a buffer overrun or another memory corruption.

* * * * *